United States Patent [19]

Kishida et al.

[11] 4,396,822
[45] Aug. 2, 1983

[54] WELDING WIRE FOR AUTOMATIC ARC WELDING

[75] Inventors: Katsuhiro Kishida; Sumio Hirao, both of Yokohama; Hirohiko Date, Yokosuka, all of Japan

[73] Assignee: Nissan Motor Co., Ltd., Yokohama, Japan

[21] Appl. No.: 312,138

[22] Filed: Oct. 16, 1981

[30] Foreign Application Priority Data

Oct. 16, 1980 [JP] Japan ................................ 55-143690

[51] Int. Cl.³ ............................................. B23K 35/30
[52] U.S. Cl. ........................... 219/137 WM; 75/128 R; 219/145.22; 219/146.1
[58] Field of Search ....................... 219/146.41, 146.24, 219/146.32, 146.22, 146.1, 137 WM, 146.23, 145.22, 145.23; 75/128 C, 128 Z

[56] References Cited

U.S. PATENT DOCUMENTS

| | | | |
|---|---|---|---|
| 2,909,778 | 10/1959 | Landis et al. | 219/146.41 X |
| 3,301,997 | 1/1967 | Semenchuk et al. | 219/146.22 X |
| 3,458,685 | 7/1969 | Tezuka et al. | 219/146.24 |
| 3,764,304 | 10/1973 | Nehrenberg et al. | 75/128 C |
| 3,865,581 | 2/1975 | Sekino et al. | 75/128 Z X |
| 4,010,309 | 3/1977 | Petersen | 219/146.23 X |
| 4,042,383 | 8/1977 | Petersen et al. | 219/146.23 X |
| 4,087,673 | 5/1978 | Kiilunen | 219/146.1 X |
| 4,122,238 | 10/1978 | Frantzerb | 219/146.1 X |

FOREIGN PATENT DOCUMENTS

| | | | |
|---|---|---|---|
| 284475 | 11/1963 | Australia | 219/146.23 |
| 51-100946 | 6/1976 | Japan | 219/146.23 |
| 53-14420 | 12/1978 | Japan . | |
| 54-4229 | 1/1979 | Japan . | |
| 54-4230 | 1/1979 | Japan . | |
| 54-4231 | 1/1979 | Japan . | |
| 645958 | 2/1948 | United Kingdom | 219/146.23 |
| 318449 | 12/1971 | U.S.S.R. | 219/146.23 |
| 525515 | 4/1977 | U.S.S.R. | 219/146.22 |

*Primary Examiner*—R. R. Kucia
*Attorney, Agent, or Firm*—Schwartz, Jeffery, Schwaab, Mack, Blumenthal & Koch

[57] ABSTRACT

A welding wire for automatic arc welding, which is particularly suitable for use in build-up welding operation for the purpose of providing hard surface to a metal die. The welding wire consists of a continuous tubular metal casing and a core composition charged in the interior of the casing and comprises such amounts of Ni, Si, B, Nb and C as essential alloying elements that the deposited metal contains at least 40% of Ni, 3–8% of Si, 0.1–0.4% of B, 0.3–1.8% of Nb and 0.2–1.5% of C, all by weight. Preferably, either a practically pure Ni strip or an Fe-Ni alloy strip is used as the material of the casing, and the core composition in the form of a powder mixture contains necessary amounts of Ni, Si, B, Nb and C, optionally with the addition of a small amount of Zr. The deposited metal given by this welding wire has high wear resistance and good antifrictional property and seldom suffers from weld cracks.

20 Claims, 4 Drawing Figures

WELDING WIRE FOR AUTOMATIC ARC WELDING

BACKGROUND OF THE INVENTION

This invention relates to a welding wire for automatic arc welding, the welding wire being of the class containing a relatively large amount of nickel and constituted of a tubular metal casing and a core composition of alloying elements with which the interior of the casing is filled. This welding wire is suitable for use in build-up welding for the purpose of providing hard surface to a metal body such as a metal die made of cast iron.

In the production of automobiles as a typical example of mass production of mechanical articles, press-forming of sheet metal plays an important role in producing various parts of the car bodies. Press-forming is a type of plastic working wherein the workpiece is subjected to relatively great contact pressure but undergoes deformation at relatively low speed. Despite the relatively low speed of deformation or sliding of the workpiece along the die face of the metal press-forming die, abrasion or wear of the die face is a matter of important concern in the case of mass production. According to the recent trend in the design of car bodies, there is an increasing need of performing very deep drawing or very severe and precise bending or stretching to obtain desirably shaped car body parts such as panels. Therefore, greater attention is paid to the wear resistance and antifrictional property of the metal die for such press-forming operations. As will be understood, wear of the die face results in lowering in the dimensional precision of the shaped article and raises the need for considerable time and labor to repair the die and remedy the unsatisfactory product. Where the antifrictional property of the die face is insufficient, the press-forming operation is liable to suffer from seizing between the die face and the workpiece brought into sliding contact with the die face and results in the appearance of scratches on the surface of the shaped article, and/or undesirable in the surface roughness of the shaped article. Currently prevalent to use cast iron as the material of relatively large-sized metal dies for press-forming of steel sheet, and of course there is the need of providing a hard surface to such metal dies by certain kinds of surface treatment.

Hard chromium plating is an example of surface treatment techniques to provide cast iron bodies with a hard, wear-resistant and fairly antifrictional coating layer. However, in the case of large-sized metal dies for deep drawing or severe stretch forming, the plated chromium layer is liable to peel off the cast iron surface during repeated press-forming operations. Therefore, it has been the practice to form a hard coating layer by an overlaying welding or build-up welding process. However, hitherto developed iron base welding materials for this purpose are generally unsatisfactory primarily because of the high probability of the occurrence of weld cracks. Besides, the deposited metal resulting from any of such welding materials is insufficient in its antifrictional property, so that the use of a metal die treated by this welding method tends to result in considerable scratching of the shaped articles. Furthermore, the coating on the die face itself undergoes considerable wear. Therefore, in this case it becomes necessary to use a highly effective lubricant in the press-forming process.

Recently developed nickel base and iron-nickel base welding materials are said to be suitable for use in build-up welding operations for the purpose of overlaying cast iron bodies with a hard and antifrictional coating layer. It is true that when these welding materials are applied to metal dies the probability of scratching of the shaped articles can be greatly reduced even when press-forming is performed with insufficient lubrication. However, these nickel or iron-nickel base welding materials are generally insufficient in the wear resistance of the deposited metal, so that the metal dies treated with these welding materials are short in service life and are liable to cause lowering of the dimensional precision of the shaped articles and, particularly in the case of shaping relatively large-sized panels, wrinkling of the shaped panels.

These nickel or iron-nickel base welding materials are mostly in the form of covered electrodes for use in shielded metal arc welding processes. Compared with an automatic arc welding process using a continuous welding wire, a shielded metal arc welding process using a covered electrode requires considerable manhours for replacement of the electrodes, removal of slag from the surface of the deposited metal and subsequent brushing of the weld zones. In the case of a build-up welding operation it is usual to perform multi-layer welding, and, therefore, the large number of manhours necessary for such auxiliary procedures in the use of such covered electrodes becomes a matter of great concern. There is a keen demand for a welding wire for use in automatic arc welding processes, wherein the welding wire gives deposited metal having sufficiently high hardness and improved antifrictional properties.

SUMMARY OF THE INVENTION

It is an object of the present invention to provide a welding wire for automatic arc welding, which welding wires gives a deposited metal having a high wear resistance and good antifrictional property without suffering from weld cracks even when used in welding on a relatively large-sized body of cast iron and accordingly is suitable for use in build-up welding on metal dies.

A welding wire according to the invention for automatic arc welding consists of a continuous tubular metal casing and a core composition charged in the interior of the casing and comprises such amounts of Ni, Si, B, Nb and C as essential alloying elements that deposited metal given by theis welding wire contains at least 40% by weight of Ni, 3 to 8% by weight of Si, 0.1 to 0.4% by weight of B, 0.3 to 1.8% by weight of Nb and 0.2 to 1.5% by weight of C.

Though inessential, this welding wire may further comprise Fe as an additional alloying element, and it is preferred that the welding wire contains such an amount of Zr that the deposited metal contains up to 0.2% by weight of Zr.

It is preferred that a major portion of Ni as the main constituent of the deposited metal is contained in the casing of the welding wire, whereas the others of the essential alloying elements are all contained in the core composition.

Preferably the material of the tubular casing is either a practically pure nickel strip containing at least 95% by weight of Ni or an iron-nickel alloy strip containing at least 50% by weight of Ni. In either case, the core composition is preferably prepared such that the essential alloying elements contained in the core composition amounts to the following percentages of the total weight of a unit length of the welding wire. Ni: at least 10%, Si: 3.3 to 9.0%, B: 0.12 to 0.50%, Nb: 0.33 to 2.00%, C: 0.3 to 2.0%, and Zr: 0 to 0.3%. The total amount of Ni in the welding wire should be at least 42% of the total weight of a unit length of the welding wire.

A welding wire according to the invention is advantageous principally in that build-up welding operations using this welding wire can be accomplished without the occurrence of weld cracks practically irrespective of the size and shape of metal bodies, such as cast iron bodies, as the objectives of the welding and that deposited metal given by this welding wire has high wear resistance and good antifrictional properties. Accordingly, ths welding wire is particularly suitable for use in build-up welding for the purpose of providing a hard surface to a metal die for press-forming of metal sheet. By using a metal die overlaid with the deposited metal given by this welding wire, a metal sheet such as a steel sheet can be press-formed without suffering from seizing between the die face and the metal sheet brought into sliding contact with the die face or scratching of the metal sheet during its sliding contact with the die face, and in most cases it is possible to smoothly accomplish press-forming without using any lubricant. When this welding wire is used in overlaying of a metal die, even corner regions or otherwise intricately shaped regions of the die can easily and satisfactorily be overlaid with the deposited metal which is free from weld cracks. Usually there is no need for subjecting the metal die to pre- or after-heating treatment or peening treatment with the intention of avoiding the occurrence of weld cracks, so that the build-up welding operations can be performed at greatly reduced cost. Also it is easy to repair a metal die or make a local modification of a metal die by build-up welding using a welding wire of the invention. Needless to mention an automatic arc welding process using a continuous welding wire is used instead of a shielded metal arc welding numerous advantages may be acheived, such as no need for troublesome replacement of covered electrodes and removal of slag and the possibility of producing a far larger quantity of deposited metal per unit time.

DESCRIPTION OF THE PREFERRED EMBODIMENTS

Figure 1:
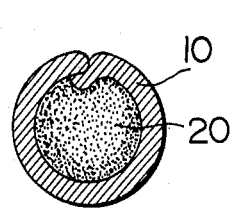
FIG. 1 is a cross-sectional view of a welding wire according to the invention.

As shown in FIG. 1, a welding wire according to the invention consists of a continuous tubular metal casing 10 and a core composition 20 charged in the casing 10 to fill up the interior of the casing 10. As a feature of this welding wire, the core composition 20 consists essentially of alloying elements in its entirety without containing any flux component. In other words, when this welding wire is used in an automatic arc welding process, the casing 10 and the core composition 20 jointly serve as a welding material and entirely turn into deposited metal except for a practically inevitable loss.

A fundamental requisite to a welding wire according to the invention is to contain such amounts of Ni, Si, B, Nb and C that the deposited metal contains at least 40% of Ni, 3 to 8% of Si, 0.1 to 0.4% of B, 0.3 to 1.8% of Nb and 0.2 to 1.5% of C, all by weight. Optionally and rather preferably, this welding wire may additionally contain Zr such that the deposited metal contains up to 0.2% by weight of Zr. The balance of the deposited metal consists of Fe, which is not essential but usually contained in the welding wire, and inevitable impurities. For the essential elements of the deposited metal, the upper and lower boundaries of their respective amounts have been determined on the following grounds. In the following description the percentages of the elements are given always by weight.

Nickel affords a good antifrictional property to the deposited metal. In the case of, for example, a metal die for a press-forming process produced through a build-up welding operation using a welding wire of the invention, the presence of a sufficient amount of Ni in the deposited metal on the die surface is quite effective for greatly reducing the friction between the die surface and a steel sheet brought into sliding contact with the die face, so that the press-forming operation can be accomplished without suffering from seizing between the die face and the steel sheet or scratching of the shaped steel sheet by the die surface. When the content of Ni in the deposited metal is less than 40%, it is likely that a metal sheet brought into sliding contact with the deposited metal will be scratched considerably.

Silicon combines mostly with nickel and iron to form silicon compounds high in hardness and wear resistance and therefore contributes to the enhancement of the hardness and wear resistance of the deposited metal. However, this effect is scarcely appreciable and, hence, the wear resistance of the deposited metal is insufficient when the contact of Si in the deposited metal is less than 3%. The hardness of the deposited metal continues to augment even when the Si content is increased beyond 8%, but such an increase in the Si content no longer brings about a great enhancement of the wear resistance and, as a more serious problem, causes the deposited metal to become brittle and susceptible to weld cracks.

Boron is effective for enhancement of the hardness and wear resistance of the deposited metal. This effect becomes fully appreciable when the deposited metal contains at least 0.1% of B and is augmented by the co-existence of carbon. The upper boundry of the B content in the deposited metal is set at 0.4% because a further increase in the content of B renders the deposited metal brittle and susceptible to weld cracks and significantly lowers machinability of the deposited metal.

Niobium renders the structure of the deposited metal fine-grained and greatly lowers the susceptibility of the deposited metal to weld cracks. These effects become fully appreciable when the content of Nb in the deposited metal reaches about 0.3%. However, the presence of more than 1.8% of Nb in the deposited metal leads to the formation of undesirably large amounts of compounds of Nb with Ni or B, the result being that the deposited metal becomes excessively hard and brittle and is liable to suffer from weld cracks.

Carbon in the deposited metal partly enters the alloyed matrix as a constituent of solid solutions and partly combines with Nb and/or B to form fine grains of carbides. Therefore, the wear resistance of the deposited metal is considerably enhanced when the content of C reaches about 0.2%. This effect of C augments as the amount of C is increased, but it is undesirable to increase the C content beyond 1.5% because it results in an excessive increase in the amounts of the aforementioned carbides and enlargement of the carbide grains so that a metal sheet brought into sliding contact with the deposited metal is liable to be scratched by the edges of the hard and large grains of the carbides.

Zirconium has the effect of rendering the structure of the deposited metal fine-grained and, therefore, greatly lowering the susceptibility of the deposited metal to weld cracks. Such effect of Zr becomes fully appreciable when the content of Zr in the deposited metal reaches about 0.01% and augments as the content of Zr increases. However, the presence of more than 0.2% of Zr in the deposited metal is undesirable because the deposited metal tends to become brittle and susceptible to weld cracks. As will be understood from the above explanation, Zr is similar in effect to Nb which is always contained in a welding of the invention. When the welding wire is for use in build-up welding on relatively small-sized metal dies or in only weakly stressed regions of larger metal dies, weld cracks can surely be prevented by the presence of the above described amount of Nb without the addition of Zr. However, when the welding wire is for application to large-sized metal dies that are high in the rate of natural cooling after welding or to severely stressed regions of metal dies, the presence of Zr in addition to Nb is quite effective for prevention of weld cracks on condition that the amount of Zr in the deposited metal does not exceed 0.2%.

In the present invention it is preferred that a major portion of Ni as one of the above described essential elements of the deposited metal is originally contained in the tubular casing 10 of the welding wire. In theory, it is permissible that a portion of the other alloying elements, Si, B, Nb and C, and Zr where desired, are contained in a metal strip as the material of the casing 10 in a state alloyed with Ni. In practice, however, this will offer difficulty in the tube-forming operation for the manufacture of the welding wire and will consequently lead to lowered productivity and increased production cost. Therefore, it is preferred that the essential elements of the deposited metal except Ni are entirely contained in the core composition 20. When desired, Zr too would be contained in the core composition 20. It is permissible that the casing 10 supplies the entire quantity of Ni to be contained in the deposited metal, but in practice it is more convenient and preferable to allot a portion of Ni to the core composition 20.

As to the material of the tubular casing 10, it is possible to use either a practically pure nickel strip containing at least 95% by weight of Ni or a less costly iron-nickel alloy strip. In the latter case, it is preferable that the alloy strip contains at least 50% by weight of Ni and the balance of Fe, aside from inevitable impurities.

Whether the material of the casing 10 is practically Ni alone or Fe-Ni alloy, the core composition 20 contains the following amounts of the remaining alloying elements, in terms of percentages of the total weight of a unit length of the welding wire: 3.3 to 9.0% of Si, 0.12 to 0.50% of B, 0.33 to 2.00% of Nb, and 0.3 to 2.0% of C. For these alloying elements, the upper and lower boundaries of their respective amounts in the core composition have been determined so as to meet the above described limitations to the composition of the deposited metal, and also with consideration of the following matters and inevitable losses of these elements during welding operations.

The lower boundary of the amount of Si in the core composition is set at 3.3% of the total weight of a unit length of the welding wire to ensure the presence of at least 3% of Si in the deposited metal. Besides the effect of enhancing the hardness and wear resistance of the deposited metal, Si contained in the core composition has the effect of improving the fluidity of the molten metal and consequentially improving the appearance of weld beads and the quality of the weld zones. For a welding wire for use in automatic welding, good fluidity of the molten metal is particularly favorable because in an automatic welding process a far larger quantity of deposited metal is produced per unit time than in a manual welding process and, hence, insufficiency of the fluidity of the molten metal is liable to result in unsatisfactory weld penetration into the parent metal. However, it is undesirable to increase the amount of Si in the core composition beyond 9% of the total weight of the welding wire because the deposited metal becomes brittle and tends to suffer from weld cracks.

The amount of B in the core composition is limited within the range from 0.12 to 0.50% of the total weight of a unit length of the welding wire with a view to ensuring the favorable effect of B on the wear resistance of the deposited metal without rendering the deposited metal too brittle and without sacrificing the operability of the welding wire. With a similar view, the amount of Nb in the core composition is limited within the range from 0.33 to 2.0% of the total weight of the welding wire.

Carbon contained in the core composition serves not only as an alloying element but also as a strong deoxidizing agent. In a welding wire of the invention which contains no flux component in its core composition, the function of C as a deoxidizing agent is particularly important. When the amount of C in the core composition is less than 0.3% of the total weight of a unit length of the welding wire it is doubtful whether the content of C in the deposited metal will reach the lower boundary of the specified range and, moreover, it is difficult to obtain defect-free beads because of strong tendencies to pits, blow holes and insufficient weld penetration to the parent metal. On the other hand, when the amount of C in the core composition is more than 2.0% of the total weight of the welding wire the deposited metal is liable to become degraded in its antifrictional property because of the presence of excessively large amounts of carbides. Besides, in the case of using a welding wire of such a high carbon content it is likely that the transfer of the molten metal to the parent metal becomes discontinuous to result in failure to obtain continuous beads of good appearance.

When Zr is added to the core composition for the above described purpose, the amount of Zr in the core composition should not exceed 0.3% of the total weight of a unit length of the welding wire because the presence of a larger amount of Zr will cause weld cracks as explained hereinbefore. Besides, the use of such a large amount of Zr makes it difficult to obtain weld beads of good appearance because of lowering of the fluidity of the molten metal and, due to strong affinity of zirconium to oxygen, results in the formation of a hardly removable oxide layer on the surface of the beads. To ensure that the deposited metal will contain at least 0.01% by weight of Zr, the minimum amount of the optionally used Zr in the core composition would be made about 0.03% of the total weight of the welding wire.

In addition to the above described elements, preferably the core composition contains Ni amounting to at least 10% of the total weight of a unit length of the welding wire. It is permissible that the core composition additionally contains some amount of Fe. The presence of Fe offers no problems insofar as the deposited metal given by this welding wire contains at least 40% by weight of Ni.

Figure 2:
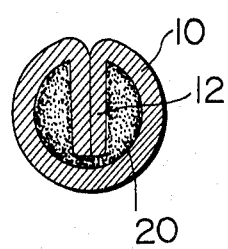
FIGS. 2 and 3 show respectively two examples of variations in the cross-sectional shape of a welding wire according to the invention.
Figure 3:
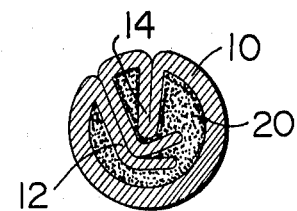

The core composition 20 is prepared as a powder mixture and charged into the tubular casing 10 at the stage of forming the casing 10 by rolling up a metal strip. The cross-sectional shape of a welding wire of the invention is not limited to the shape shown in FIG. 1. As shown in FIG. 2, the lapped edge regions of the metal strip may be folded inwardly so as to give an axially extending ridge 12 in the interior of the tube-shaped casing 10. As shown in FIG. 3, the metal strip may further be folded in a region fairly distant from its edges such that an additional ridge 14 projects into the interior of the tubular casing 10 and extends axially of the casing 10. As will be understood, the cross-sectional shape of the welding wire can be modified still differently. The cross-sectional shape is selected mainly with consideration of the rollability of the metal strip employed as the material of the casing 10, a desired weight ratio of the core composition 20 to the entire welding wire and the operability of the welding wire in automatic arc welding operations. In general, the weight ratio of the core composition 20 to the entire welding wire becomes from about 40 to about 45% when the welding wire has the cross-sectional shape of FIG. 1, and becomes from about 30 to about 35% in the case of the cross-sectional shape of FIG. 2, and from about 20 to about 25% in the case of FIG. 3.

The invention will be further illustrated by the following examples and comparative experiments.

EXAMPLE 1

In this example, a nickel strip having a width of 10 mm and a thickness of 0.25 mm was used as the material of the tubular casing 10 of a welding wire according to the invention. Table 1 shows the result of analysis of this nickel strip.

TABLE 1

| Nickel Casing Material (Wt %) | | | | | | | |
|---|---|---|---|---|---|---|---|
| C | Si | Mn | P | S | Fe | Ni | other impurity |
| 0.04 | 0.06 | 0.28 | 0.003 | 0.002 | 0.04 | balance | <0.5 |

As Examples 1A, 1B and 1C, three kinds of core compositions were prepared by mixing powdery raw materials so as to contain alloying elements in the proportions as shown in the following Table 2, respectively. In each composition, Si, B, Nb and Zr were present in the form of their respective ferroalloys, and the amount of Fe refers to the total of the Fe components of such ferroalloys. Each of the raw materials was in the form of a fine powder passed through a 325-mesh sieve (0.043 mm openings). By using the aforementioned nickel strip and these three kinds of core compositions each individually, three kinds of welding wires according to the invention were produced in the same manner. The cross-sectional shape of these welding wires was as shown in FIG. 2. For every welding wire, the outer diameter of the tubular casing 10 was 3.2 mm, and the weight ratio of the core composition to the entire welding wire was about 34%. In the following Table 2, the amounts of the respective elements are given as percentages to the total weight of a unit length of each welding wire. In every core composition, the amount of Ni was determined such that the interior of the casing was just filled with the core composition.

REFERENCE 1

As Reference 1A, the core composition of Example 1A was modified by decreasing the amounts of Si and C beyond the lower limits according to the invention. As Reference 1B, the core composition of Example 1B was modified by increasing the amounts of Si and C beyond the upper limits according to the invention. The amounts of the alloying elements of the core compositions of Reference 1A and 1B are also shown in Table 2. By using these two core compositions each individually, two welding wires not in accordance with the invention were produced similarly to the welding wires of Examples 1A to 1C.

TABLE 2

| | Core Compositions (Wt % of entire welding wire) | | | | |
|---|---|---|---|---|---|
| Elements | Ex. 1A | Ex. 1B | Ex. 1C | Ref. 1A | Ref. 1B |
| Ni | 18 | 12 | 20 | 19 | 12 |
| Si | 4.8 | 9.0 | 3.5 | 3.0 | 10.0 |
| B | 0.3 | 0.5 | 0.12 | 0.3 | 0.3 |
| Nb | 1.2 | 2.0 | 0.33 | 1.2 | 1.2 |
| C | 1.0 | 1.8 | 0.5 | 0.2 | 2.3 |
| Zr | 0.05 | 0.3 | 0 | 0 | 0.35 |
| Fe | 8.2 | 15.0 | 5.3 | 5.8 | 15.3 |

Each of the welding wires of Examples 1A, 1B and 1C and References 1A and 1B was used in an automatic arc welding operation which was carried out in the manner of build-up welding to form six layers of beads on the surface of a carbon steel plate. The welding conditions were as follows. Current intensity: 350–370 A. Polarity of the current: the welding wire was charged positively. Shield gas: argon gas, at a flow rate of 20 liters per minute. For the tested welding wires, the analytical values of the compositions of the deposited metals were as shown in Table 3. The sample for analysis of each deposited metal was taken from the outermost bead layer. Table 3 additionally contains the results of analysis of deposited metals given by a conventional Ni base covered electrode and a conventional Fe base covered electrode both for use in shielded metal arc welding.

TABLE 3

| | Analysis of Deposited Metal (Wt %) | | | | | | | |
|---|---|---|---|---|---|---|---|---|
| | C | Si | B | Nb | Zr | Ni | Fe | other |
| Ex. 1A | 0.72 | 4.2 | 0.27 | 1.0 | 0.03 | 81.7 | balance | <0.5 |
| Ex. 1B | 1.44 | 7.9 | 0.40 | 1.71 | 0.16 | 72.6 | balance | <0.5 |
| Ex. 1C | 0.38 | 3.2 | 0.11 | 0.31 | — | 89.4 | balance | <0.5 |
| Ref. 1A | 0.16 | 2.8 | 0.24 | 1.14 | — | 88.2 | balance | <0.5 |
| Ref. 1B | 1.60 | 9.4 | 0.26 | 1.06 | 0.22 | 71.1 | balance | <0.5 |
| Ni base | 0.70 | 0.39 | — | — | — | balance | 5.36 | <1.0 |

TABLE 3-continued

| | Analysis of Deposited Metal (Wt %) | | | | | | | |
|---|---|---|---|---|---|---|---|---|
| | C | Si | B | Nb | Zr | Ni | Fe | other |
| electrode | | | | | | | | |
| Fe base electrode | 0.10 | 0.22 | — | — | — | 0.06 | balance | Cr, Mn, etc. ca. 5% |

The hardness values (Vickers hardness, measured in five different points) of the deposited metals and the conditions of the weld beads are shown in Table 4 together with the results of the following tests.

To evaluate the wear resistance and antifrictional property of deposited metal given by each of the welding wires of Examples 1A to 1C and References 1A and 1B and the aforementioned covered electrodes, a combination of a female die and a blank holder for drawing of a steel sheet into a cup having an outer diameter of 35 mm and a height of 15 mm was produced by performing a build-up welding operation on the rough-formed die and blank holder of cast iron by using each welding wire or covered electrode. Each set of the die and blank holder was used in a successive drawing operation to form 10,000 cups from a cold rolled steel sheet having a thickness of 0.4 mm. Before and after the drawing operation, the surface roughness of each blank holder in a region coming into sliding contact with the steel sheet was measured to the accuracy of 0.1 μm to represent the wear resistance of the deposited metal by the difference of the surface roughness value after the drawing operation from the initial surface roughness value. The results are shown in Table 4.

The antifrictional property of each deposited metal was evaluated by measuring the depth of minute scratches appeared on the cylindrical outer surfaces of the cups formed at the last stage of the drawing operation for each set of the die and blank holder. In the column of antifrictional property in Table 4, the characters A, B, C and D represent the following depths of the scratches, respectively.
A: less than 5 μm
B: more than 5 μm inclusive, but less than 10 μm
C: more than 10 μm inclusive, but less than 15 μm
D: more than 15 μm inclusive.
For reference, the surface roughness of the steel sheet subjected to drawing was 3 μm on the average. Not only the dies of Rank A but also the dies of Rank B were judged to be of practical use in ordinary drawing operations.

TABLE 4

| | Results of Evaluation Tests | | | | |
|---|---|---|---|---|---|
| | Hardness of Deposited Metal (Hv) | Weld Beads | Wear Resistance | Antifrictional Property | Total Evaluation |
| Ex. 1A | 270–292 | excellent | 1.2 μm | A | excellent |
| Ex. 1B | 364–376 | good | 0.8 μm | B | good |
| Ex. 1C | 233–258 | excellent | 1.8 μm | A | excellent |
| Ref. 1A | 229–238 | arc was unstable, pits, and blow holes observed, penetration insufficient | 2.2 μm | D | bad |
| Ref. 1B | 387–401 | meandering beads, discontinuous transfer of molten metal | 1.6 μm | C | bad |
| Ni base covered electrode | 142–158 | good | 3.8 μm | A | bad |
| Fe base covered electrode | 306–320 | sometimes weld cracks | 1.5 μm | D | bad |

The results of these tests clearly demonstrate superiority of welding wires according to the invention containing a sufficient amount of Ni together with well balanced amounts of Si, B, Nb and C (and optionally Zr) to conventional welding materials, particularly in wear resistance and antifrictional property of the deposited metal. The welding wires according to the invention were good also in operability. In the case of performing the aforementioned build-up welding operation on the steel plate by automatic arc welding using a welding wire of the invention, it took only about a half of time to complete the welding operation compared with the case of performing the same build-up welding by shielded metal arc welding using the Ni base or Fe base covered electrode.

EXAMPLE 2

Based on Example 1A, an experiment was carried out to more minutely examine the relationship between the content of Nb in the deposited metal and the hardness of the deposited metal and the probability or scale of weld cracks. That is, the core composition of Example 1A was modified to three different compositions (Examples 2A, 2B and 2C, as shown in Table 5) by varying the amount of Nb within the limitations according to the invention without varying the amounts of Si (4.8%), B (0.3%), C (1.0%) and Fe (about 8%) but omitting Zr. The amount of Ni was slightly varied according to the varied amount of Nb. For comparison, additionally two compositions (References 2A and 2B) were prepared by increasing and decreasing the amount of Nb beyond the limitations according to the invention.

Welding wires were produced by using these core compositions each individually and otherwise in accordance with Example 1. These welding wires were evaluated by using them for the build-up welding operation mentioned in Example 1. The results are also shown in Table 5.

TABLE 5

| | Effects of Nb | | | |
|---|---|---|---|---|
| | Nb in Welding Wire (Wt %) | Nb in Deposited Metal (Wt %) | Hardness of Deposited Metal (Hv) | Weld Cracks |
| Ex. 2A | 0.50 | 0.43 | 250–265 | none |
| Ex. 2B | 1.50 | 1.23 | 295–305 | none |
| Ex. 2C | 2.0 | 1.70 | 302–314 | none |
| Ref. 2A | 0.30 | 0.27 | 240–264 | some |
| Ref. 2B | 2.3 | 1.84 | 294–318 | considerable |

As can be seen in Table 5, when the content of Nb in the deposited metal was less than 0.3% weld cracks appeared despite relatively low hardness of the deposited metal. When the content of Nb in the deposited metal was more than 1.8%, the deposited metal became too hard and brittle, and there were considerable weld cracks. Thus, this experiment confirmed the appropriateness of limiting the content of Nb in the deposited metal within the range from 0.3 to 1.8%.

EXAMPLE 3

The purpose of this example was to examine the effect of co-existence of Zr and Nb in the deposited metal. Besides the size and design of metal bodies such as metal dies as the objective of build-up welding operations, the amounts of alloying elements other than Ni in the deposited metal would be considered as a factor in deciding to add Zr or not. That is, when a welding wire of the invention contains relatively large amounts of alloying elements other than Ni as in the case of Example 1B the addition of Zr was presumed to be favorable.

Four kinds of core compositions (Examples 3A–3D) were prepared by slightly modifying the core composition of Example 1B and varying the amount of Zr within the range from 0% to 0.3% of the total weight of the welding wire, as shown in Table 6, and another core composition (Reference 3) was prepared by increasing the amount of Zr to 0.35%. The amounts of the alloying elements other than Ni were kept constant (Si: 8%, B: 0.4%, Nb: 2.0%, C: 1.6%, and Fe: about 14%). The amount of Ni was varied according to the varied amount of Zr.

Figure 4:
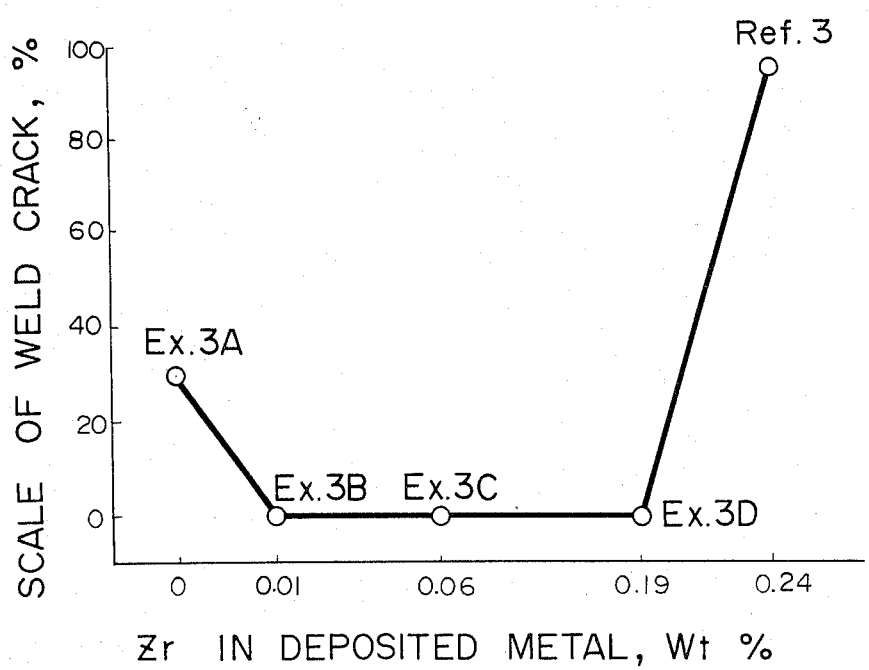
FIG. 4 is a graph showing the relationship between the amount of zirconium contained in deposited metal and the scale of weld cracks observed in an experimental arc welding operation.

Welding wires were produced by using these core compositions each individually and otherwise in accordance with Example 1. Each of the sample welding wires thus produced was used in an experimental build-up welding operation to form two layers of three-row weld beads on the cylindrical surface of a cylindrical block of gray cast iron (240 mm in diameter and 150 mm in length). The beads were about 50 mm in width and about 120 mm in length. For each sample, the length of transverse bead cracks appearing in the outer bead layer was measured to represent the scale of weld cracks by the proportion (percentage) of the measured bead crack length to the width of the beads. The result of this experiment is shown in Table 6 and in FIG. 4. Table 5 contains the hardness values of the deposited metals, too.

TABLE 6

| | Effects of Zr | | | |
|---|---|---|---|---|
| | Zr in Welding Wire (Wt %) | Zr in Deposited Metal (Wt %) | Hardness of Deposited Metal (Hv) | Weld Crack |
| Ex. 3A | 0 | 0 | 297–310 | 30% |
| Ex. 3B | 0.02 | 0.01 | 304–318 | 0% |
| Ex. 3C | 0.10 | 0.06 | 302–320 | 0% |
| Ex. 3D | 0.30 | 0.19 | 323–349 | 0% |
| Ref. 3 | 0.35 | 0.24 | 320–338 | 95% |

The use of the welding wire of Example 3A resulted in the occurrence of weld cracks in the scale of about 30% according to the above explained definition. However, it was easy to prevent weld cracks of such magnitude by preheating of the parent metal and after-heating of the weld zone or peening of the weld zone, so that the welding wire of Example 3A too was judged to be of practical use. As can be seen clearly in Table 6 and FIG. 4, weld cracks can completely be prevented even when the parent metal is cast iron that is highly susceptible to weld cracks by causing the deposited metal to contain not more than 0.2% of Zr in addition to an adequate amount of Nb. However, when the content of Zr in the deposited metal exceeds 0.2% there arises a strong possiblity of the occurrence of significant weld cracks presumably because the deposited metal becomes very brittle particularly at the interfaces between crystal grains. Besides, the use of such a large amount of Zr makes it difficult to form continuous and good-looking weld beads because of lowering in the fluidity of molten metal and results in that the bead surface is covered with a thin layer of oxide which is very difficult to remove, negativing an advantage of a welding wire of the invention that no slag is formed in any arc welding process using this welding wire.

EXAMPLE 4

In this example welding wires according to the invention were produced by using a Fe-Ni alloy strip cheaper than the nickel strip used in the foregoing examples as the material of the tubular casing 10. The Fe-Ni alloy strip had a thickness of 0.25 mm and a width of 10 mm. Table 7 shows the result of analysis of this Fe-Ni alloy strip.

TABLE 7

| Analysis of Fe-Ni Casing Material (Wt %) | | | | | | | |
|---|---|---|---|---|---|---|---|
| C | Si | Mn | P | S | Ni | Fe | other impurity |
| 0.06 | 0.14 | 0.61 | 0.012 | 0.012 | 58.4 | balance | <0.8 |

As shown in the following Table 8, three kinds of core compositions according to the invention (Examples 4A, 4B, 4C) and a core composition not in accordance with the invention (Reference 4A) were prepared similarly to the core compositions of Examples 1A to 1C and Reference 1A, respectively. Another core composition (Reference 4B) was prepared as a modification of the core composition of Reference 1B by replacing the entire quantity of Ni in the core composition of Reference 1B with a corresponding amount of Fe.

TABLE 8

| Core Compositions (Wt % of entire welding wire) | | | | | |
|---|---|---|---|---|---|
| Elements | Ex. 4A | Ex. 4B | Ex. 4C | Ref. 4A | Ref. 4B |
| Ni | 18 | 12 | 20 | 19 | 0 |
| Si | 4.8 | 9.0 | 3.5 | 3.0 | 10.0 |
| B | 0.3 | 0.5 | 0.12 | 0.3 | 0.3 |

TABLE 8-continued

| Elements | Core Compositions (Wt % of entire welding wire) | | | | |
|---|---|---|---|---|---|
| | Ex. 4A | Ex. 4B | Ex. 4C | Ref. 4A | Ref. 4B |
| Nb | 1.2 | 2.0 | 0.33 | 1.2 | 1.2 |
| C | 1.0 | 1.8 | 0.5 | 0.2 | 2.3 |
| Zr | 0.05 | 0.3 | 0 | 0 | 0.35 |
| Fe | 8.2 | 15.0 | 5.3 | 5.8 | 25.3 |

Welding wires of the design described in Example 1 were produced by using the Fe-Ni alloy strip and the core compositions of Examples 4A to 4C and References 4A and 4B each individually. These welding wires were evaluated by the test methods described in Example 1. For comparison, a conventional Fe-Ni base covered electrode for shielded metal arc welding was tested similarly. The results are shown in Tables 9 and 10.

TABLE 9

| | Analysis of Deposited Metal (Wt %) | | | | | | | |
|---|---|---|---|---|---|---|---|---|
| | C | Si | B | Nb | Zr | Ni | Fe | Other |
| Ex. 4A | 0.80 | 4.3 | 0.26 | 1.02 | 0.03 | 50.6 | balance | <0.8 |
| Ex. 4B | 1.46 | 9.0 | 0.40 | 1.68 | 0.14 | 41.8 | balance | <0.8 |
| Ex. 4C | 0.40 | 3.4 | 0.10 | 0.30 | — | 60.2 | balance | <0.8 |
| Ref. 4A | 0.14 | 2.7 | 0.24 | 1.12 | — | 58.2 | balance | <0.8 |
| Ref. 4B | 1.81 | 8.9 | 0.27 | 1.08 | 0.24 | 32.3 | balance | <0.8 |
| Fe-Ni based covered electrode | 0.32 | 0.82 | — | — | — | 52.9 | balance | <0.5 |

TABLE 10

| | Results of Evaluation Tests | | | | |
|---|---|---|---|---|---|
| | Hardness of Deposited Metal (Hv) | Weld Beads | Wear Resistance | Antifrictional Property | Total Evaluation |
| Ex. 4A | 282–299 | excellent | 1.0 μm | A | excellent |
| Ex. 4B | 374–383 | good | 1.3 μm | B | good |
| Ex. 4C | 262–287 | excellent | 1.9 μm | A | excellent |
| Ref. 4A | 231–244 | arc was unstable, pits and blow holes observed, penetration insufficient | 2.4 μm | D | bad |
| Ref. 4B | 396–413 | meandering beads, discontinuous transfer of molten metal | 2.0 μm | D | bad |
| Fe-Ni base covered electrode | 152–164 | good | 4.3 μm | A | bad |

As can be seen in Table 10, the welding wires of Examples 4A to 4C exhibited good characteristics generally similarly to the welding wires of Examples 1A to 1C (using Ni casing), respectively. The welding wire of Reference 4A was inferior generally similarly to the welding wire of Reference 1A. The welding wire of Reference 4B was inferior even to the welding wire of Reference 1B, particularly in the antifrictional property of the deposited metal. Besides the use of excessively large amounts of Si and C, the use of Fe powder as the volume-adjusting material in place of the Ni powder used in Reference 1B is considered to be a major reason for such degradation in the antifrictional property. Accordingly, the dependence of the antifrictional property of the deposited metal on the content of Ni was more minutely examined in the following Example 5.

EXAMPLE 5

A core composition according to the invention was prepared by replacing a portion of the Ni powder contained in the core composition of Example 4B (identical with Example 1A) by a corresponding quantity of Fe powder as shown in the following Table 11, without varying the amounts of the other alloying elements Si, B, Nb, C and Zr, and Fe contained in the ferroalloys as the raw materials of the alloying elements. As References 5A and 5B, two core compositions were prepared generally similarly, but by further decreasing Ni powder and increasing Fe powder as shown in Table 11.

Fundamentally in accordance with Example 4, welding wires were produced by using the Fe-Ni alloy strip and the core compositions of Example 5 and References 5A and 5B each individually, and these welding wires were evaluated by the test methods described in Example 1. The results are shown in Table 11.

TABLE 11

| | Effects of Ni | | | |
|---|---|---|---|---|
| | Ni and Fe in Core Composition (Wt % of entire welding wire) | | Ni in Deposited Metal (Wt %) | Antifrictional Property | Evaluation |
| | Ni | Fe | | | |
| Ex. 4A | 18 | 8.2 | 50.6 | A | excellent |
| Ex. 5 | 11 | 15 | 43.9 | B | good |
| Ref. 5A | 7 | 20 | 38.7 | D | bad |
| Ref. 5B | 0 | 25.3 | 32.3 | D | bad |

By observation under the microscope, it was confirmed that in the deposited metal given by any of these welding wires the grain sizes of the carbides were not so large as to cause scratching of a steel sheet brought into sliding contact with the deposited metal during a press-forming process.

As demonstrated by the experimental results shown in Table 11, deposited metal given by a welding wire according to the invention has a good antifrictional property together with high wear resistance so long as the content of Ni in the deposited metal is not smaller than 40% by weight, even when the deposited metal contains a relatively large amount of Fe.

In the above presented Examples the objective of build-up welding by using a welding wire of the invention were mostly cast iron bodies in the form of metal dies for press-forming processes or related metal parts, but this is by no means limitative. A welding wire according to the invention is also useful for build-up welding on different types of metal parts, which may be made of various ferrous materials other than cast iron, and exhibits its advantages in every case. Excellent properties of the welding wires of Example 1 to 5 remained unchanged when the cross-sectional design of the welding wires was modified to that of either FIG. 1 or FIG. 3.

What is claimed is:

1. A welding wire for automatic arc welding, the wire consisting of a continuous tubular metal casing and a core composition charged in the interior of the casing and comprising such amounts of Ni, Si, B, Nb and C as essential alloying elements that deposited metal given by the welding wire contains at least 40% by weight of Ni, 3 to 8% by weight of Si, 0.1 to 0.4% by weight of B, 0.3 to 1.8% by weight of Nb and 0.2 to 1.5% by weight of C.

2. A welding wire according to claim 1, wherein the balance of said deposited metal consists of Fe and inevitable impurities.

3. A welding wire according to claim 1, further comprising such an amount of Zr that said deposited metal contains up to 0.20% by weight of Zr.

4. A welding wire according to claim 3, wherein the balance of said deposited metal consists of Fe and inevitable impurities.

5. A welding wire according to claim 1, wherein the amount of Ni contained in the welding wire is at least 42% of the total weight of a unit length of the welding wire.

6. A welding wire according to claim 5, wherein the material of said casing contains at least 50% by weight of Ni.

7. A welding wire according to claim 6, wherein said core composition comprises Si, B, Nb and C respectively amounting to the following percentages of the total weight of a unit length of the welding wire:
   Si: 3.3 to 9.0%;
   B: 0.12 to 0.50%;
   Nb: 0.33 to 2.0%;
   C: 0.3 to 2.0%;

8. A welding wire according to claim 7, wherein said core composition further comprises Zr in an amount not larger than 0.3% of the total weight of a unit length of the welding wire.

9. A welding wire according to claim 6 or 7, wherein said core composition further comprises Ni in an amount not smaller than 10% of the total weight of a unit length of the welding wire.

10. A welding wire according to claim 8, wherein the balance of said core composition consists of Fe and inevitable impurities.

11. A welding wire according to claim 10, wherein the material of said casing contains at least 95% by weight of Ni.

12. A welding wire according to claim 10, wherein the material of said casing consists essentially of 50 to 60% by weight of Ni and the balance of Fe.

13. A welding wire according to claim 7, wherein said core composition is in the form of a powder mixture.

14. A welding wire according to claim 7, wherein the ratio of the weight of said core composition to the total weight of a unit length of the welding wire is in the range from 20:100 to 45:100.

15. A welding wire according to claim 1, wherein said casing is formed of a metal strip rolled up cylindrically such that one of two opposite side edge regions of said strip laps over the other side edge region, said core composition being in the form of a powder mixture.

16. A welding wire according to claim 15, wherein the ratio of the weight of said core composition to the total weight of a unit length of the welding wire is in the range from 40:100 to 45:100.

17. A welding wire according to claim 1, wherein said casing is formed of a metal strip rolled up generally cylindrically such that two opposite side edge regions of said strip are brought into close contact with each other and folded inwardly so as to constitute a ridge which protruds into the interior of said casing and extends axially of said casing, said core composition being in the form of a powder mixture.

18. A welding wire according to claim 17, wherein the ratio of the weight of said core composition to the total weight of a unit length of the welding wire is in the range from 30:100 to 35:100.

19. A welding wire according to claim 17, wherein said strip is additionally folded inwardly in a region distant from both of said two side edge regions such that the additionally folded region constitutes another ridge which protrudes into the interior of said casing and extends axially of said casing.

20. A welding wire according to claim 19, wherein the ratio of the weight of said core composition to the total weight of a unit length of the welding wire is in the range from 20:100 to 25:100.

* * * * *